(12) United States Patent
Ito

(10) Patent No.: US 8,155,396 B2
(45) Date of Patent: Apr. 10, 2012

(54) METHOD, APPARATUS, AND PROGRAM FOR DETECTING FACES

(75) Inventor: Wataru Ito, Kanagawa-ken (JP)

(73) Assignee: Fujifilm Corporation (JP)

( * ) Notice: Subject to any disclaimer, the term of this patent is extended or adjusted under 35 U.S.C. 154(b) by 1083 days.

(21) Appl. No.: 11/512,192

(22) Filed: Aug. 30, 2006

(65) Prior Publication Data

US 2007/0047824 A1    Mar. 1, 2007

(30) Foreign Application Priority Data

Aug. 30, 2005 (JP) ................. 2005-249154

(51) Int. Cl.
*G06K 9/00*    (2006.01)
(52) U.S. Cl. ....................................... 382/118
(58) Field of Classification Search .................. 382/118, 382/289
See application file for complete search history.

(56) References Cited

U.S. PATENT DOCUMENTS

| | | | | |
|---|---|---|---|---|
| 5,881,171 A * | 3/1999 | Kinjo | ............ | 382/199 |
| 6,915,025 B2 * | 7/2005 | Wang et al. | ............ | 382/289 |
| 7,489,803 B2 * | 2/2009 | Haynes et al. | ............ | 382/103 |
| 7,889,892 B2 * | 2/2011 | Terakawa | ............ | 382/118 |
| 2005/0100195 A1 | 5/2005 | Li | | |
| 2011/0103695 A1 * | 5/2011 | Sato et al. | ............ | 382/190 |

FOREIGN PATENT DOCUMENTS

JP    2004-133637 A    4/2004

OTHER PUBLICATIONS

S. Lao et al., "Fast Omni-Directional face Detection", Meeting on Image Recognition and Understanding, Jul. 2004, pp. II271-II276.

* cited by examiner

*Primary Examiner* — Matthew Bella
*Assistant Examiner* — Dennis Rosario
(74) *Attorney, Agent, or Firm* — Studebaker & Brackett PC; Donald R. Studebaker

(57) ABSTRACT

An apparatus detects a predetermined number of facial images from detection target images. An inclination order setting means utilizes the correlative relationships among correlative data obtained by a correlative data obtaining means and the inclinations of faces that appear in input images, to determine the relative value of the probability that faces of a predetermined inclination will appear in the input images. The inclination order setting means sets the order of inclinations of faces to be detected such that faces are detected in order of inclinations according to the relative values of the probabilities, based on the correlative data that they will appear. A face detecting means detects faces within the input images while varying the inclinations of faces to be detected according to the set order.

6 Claims, 14 Drawing Sheets

FIG.9
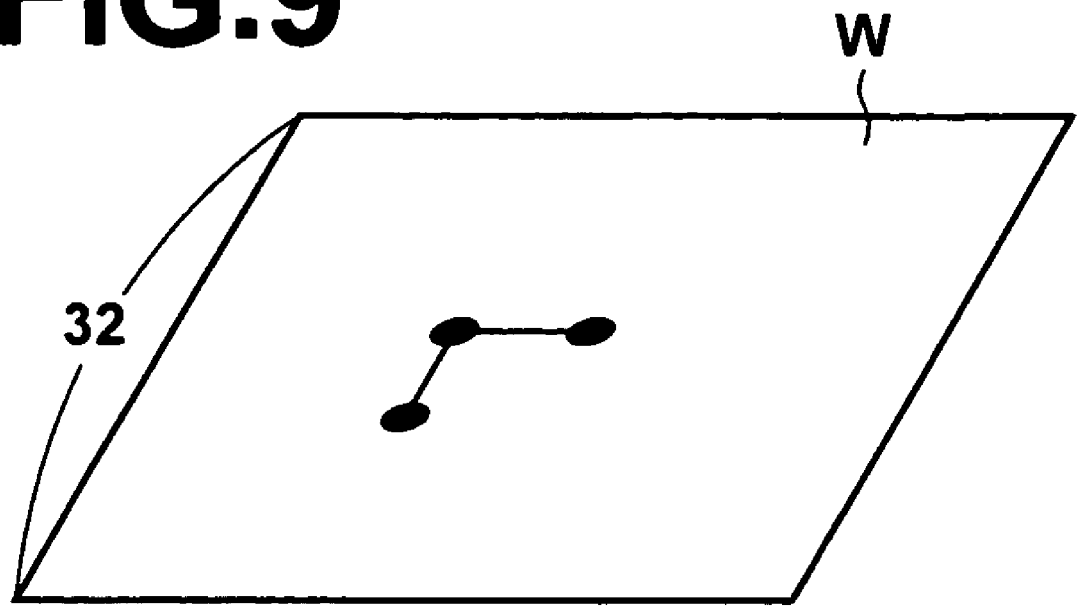
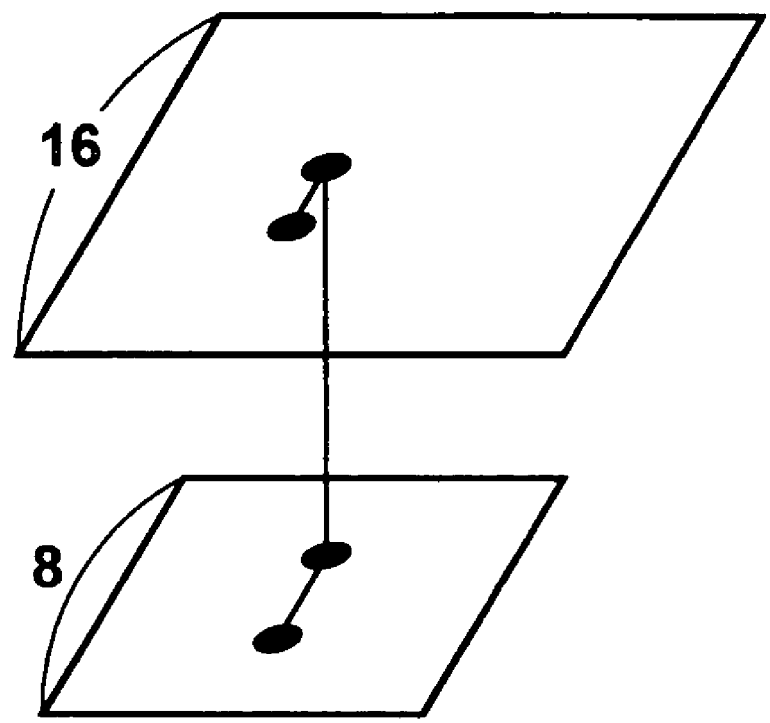

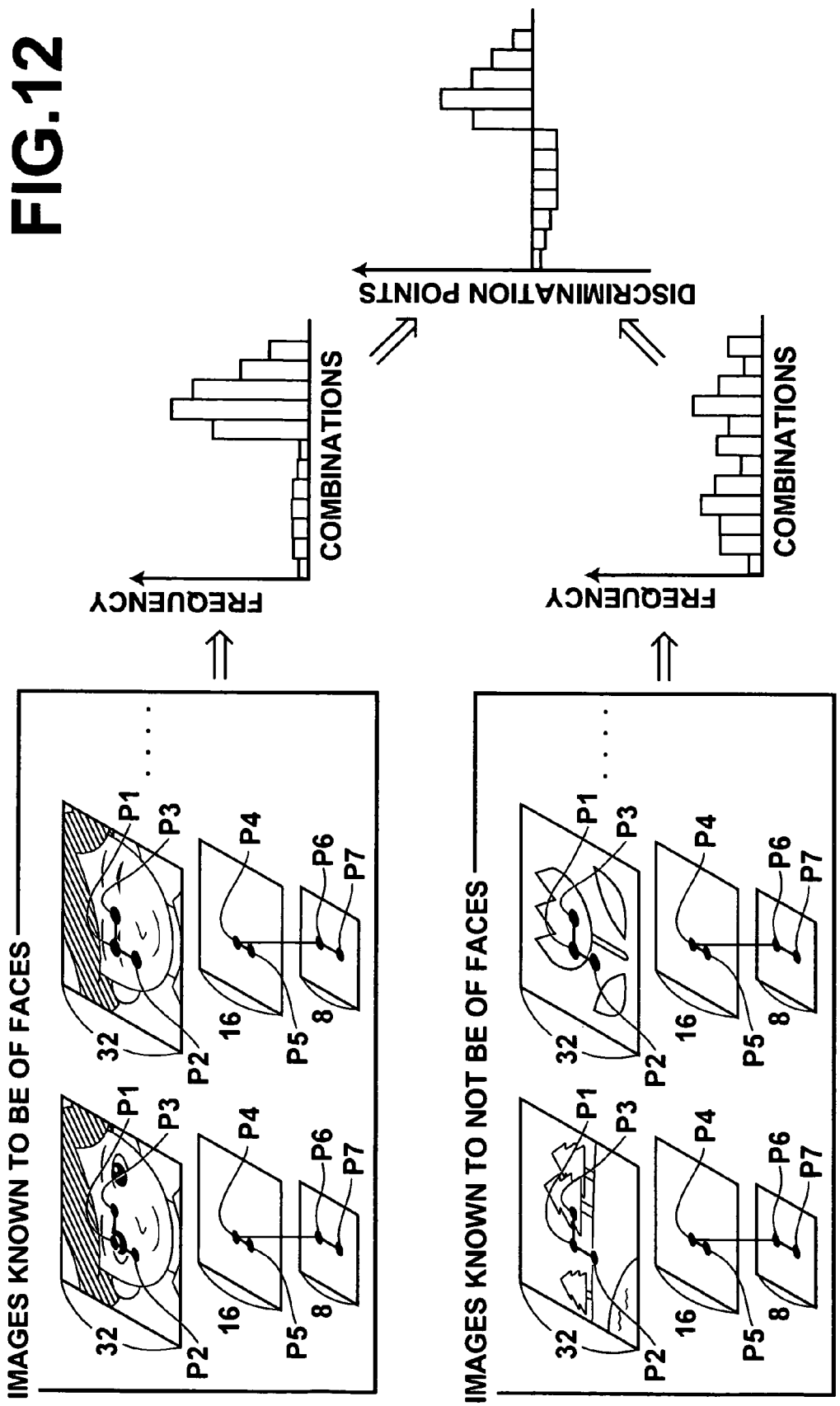

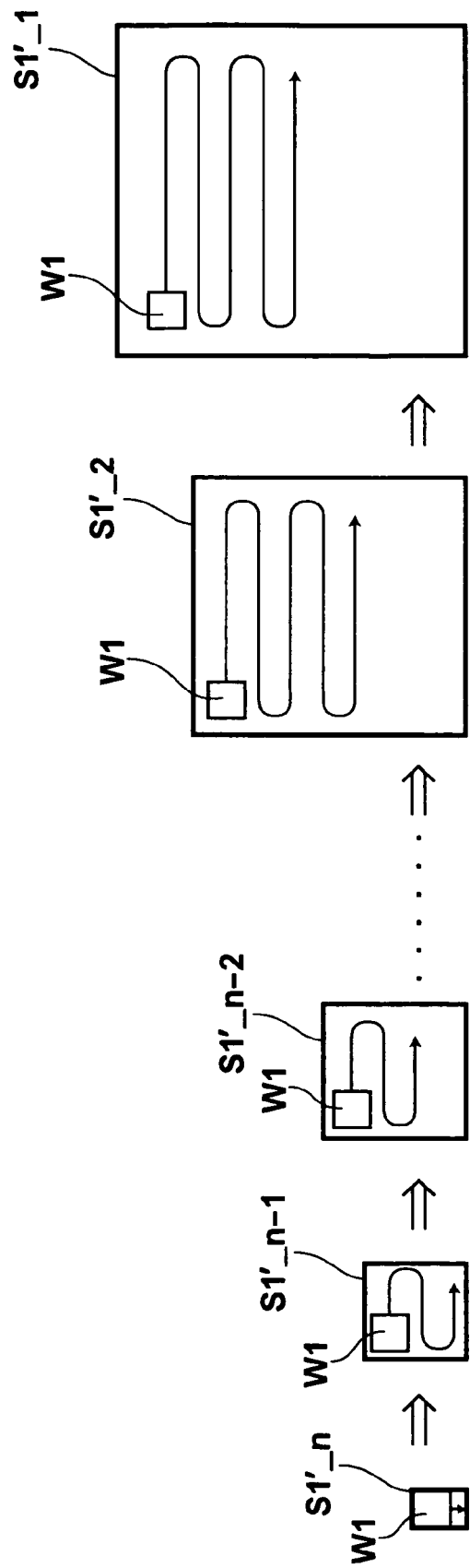

METHOD, APPARATUS, AND PROGRAM FOR DETECTING FACES

BACKGROUND OF THE INVENTION

1. Field of the Invention

The present invention relates to a method, an apparatus, and a program for detecting faces from within target images.

2. Description of the Related Art

Correction of skin tones in snapshots photographed with digital cameras by investigating color distributions within facial regions, and recognition of people who are pictured in digital images obtained by digital video cameras of security systems is being performed. In these cases, it is necessary to detect regions (facial regions) within digital images that correspond to people's faces. For this reason, various techniques for detecting faces from within digital images have been proposed.

An example of such a technique is one in which partial images are cut out at a plurality of different positions from within a detection target image. Judgment is performed regarding whether the partial images are facial images that represent faces, thereby detecting faces within the detection target image. Template matching techniques or techniques employing classifier modules, which have learned characteristics of faces by a machine learning method, may be employed to judge whether the partial images represent faces (refer to, for example, S. Lao et al., "Fast Omni-Directional Face Detection", Meeting on Image Recognition and Understanding, pp. II271-II276, July 2004, and U.S. Patent Application Publication No. 20050100195).

The positions and inclinations of faces that appear in digital images (hereinafter, simply referred to as "inclinations") are often indeterminate, excluding cases such as ID photos, for which photography conditions are substantially uniform. Meanwhile, brightness distributions that represent characteristics of faces within digital images change when the inclinations thereof change. Therefore, it is difficult to detect a plurality of faces having different inclinations with a single detection process. Accordingly, detection processes are generally repeated while varying the inclinations of faces to be detected in order to detect faces, of which the inclinations are unknown.

There are cases in which it is not necessary to detect faces having all possible inclinations. An example is a case in which only a single face needs to be detected from within detection target images. Another example is a case in which faces are to be detected from within a plurality of images which have been obtained by continuous imaging, wherein if a face is detected in one of the images, detection of faces in the other images can be accomplished by fixing the inclination to that of the detected face. In these cases, the amount of processing necessary to achieve the objective of the detection process is influenced by the order of priority assigned to inclinations of faces to be detected.

However, in conventional techniques, the order of inclinations of faces to be detected is set in advance, and there has been no particular effort to reduce the amount of processing during face detection.

SUMMARY OF THE INVENTION

The present invention has been developed in view of the foregoing circumstances. It is an object of the present invention to provide a method, an apparatus, and a program for detecting faces that reduces the amount of processing involved in face detection, and enables faster face detection.

A face detecting method of the present invention is a face detecting method for detecting faces while varying the inclination of faces to be detected in input images, comprising:

a correlative data obtaining step, for obtaining correlative data related to the inclination of faces that appear in the input images; and an order setting step, for determining the relative values of the probabilities that faces of predetermined inclinations will appear in the input images based on the correlative data, and setting the order of inclinations of faces to be detected according to an order corresponding to the relative values of the probabilities.

In the face detecting method of the present invention, the correlative data may indicate whether the input images have been obtained by continuous imaging, or whether the input images have been obtained by video imaging.

In this case, if the correlative data indicates that the input images have been obtained by continuous imaging, the order setting step determines the relative value of the probability that the inclination of a face to appear in an input image will be the same as that of the inclination of the face in a frame immediately preceding the input image to be the highest value, and sets said inclination first in the order of inclinations of faces to be detected.

Alternatively, if the correlative data indicates that the input images have been obtained by video imaging, the order setting step determines the relative value of the probability that the inclination of a face to appear in an input image will be the same as the inclination of the input images to be the highest value, and sets said inclination first in the order of inclinations of faces to be detected.

A face detecting apparatus of the present invention is a face detecting apparatus for detecting faces while varying the inclination of faces to be detected in input images, comprising:

correlative data obtaining means, for obtaining correlative data related to the inclination of faces that appear in the input images; and inclination order setting means, for determining the relative values of the probabilities that faces of predetermined inclinations will appear in the input images based on the correlative data, and setting the order of inclinations of faces to be detected according to an order corresponding to the relative values of the probabilities.

In the face detecting apparatus of the present invention, the correlative data may indicate whether the input images have been obtained by continuous imaging, or whether the input images have been obtained by video imaging.

In this case, if the correlative data indicates that the input images have been obtained by continuous imaging, the inclination order setting means determines the relative value of the probability that the inclination of a face to appear in an input image will be the same as that of the inclination of the face in a frame immediately preceding the input image to be the highest value, and sets said inclination first in the order of inclinations of faces to be detected.

Alternatively, if the correlative data indicates that the input images have been obtained by video imaging, the inclination order setting means determines the relative value of the probability that the inclination of a face to appear in an input image will be the same as the inclination of the input images to be the highest value, and sets said inclination first in the order of inclinations of faces to be detected.

A program of the present invention is a program that causes a computer to function as a face detecting apparatus for detecting faces while varying the inclination of faces to be detected in input images, comprising:

correlative data obtaining means, for obtaining correlative data related to the inclination of faces that appear in the input images; and inclination order setting means, for determining the relative values of the probabilities that faces of predetermined inclinations will appear in the input images based on the correlative data, and setting the order of inclinations of faces to be detected according to an order corresponding to the relative values of the probabilities.

In the program of the present invention, the correlative data may indicate whether the input images have been obtained by continuous imaging, or whether the input images have been obtained by video imaging.

In this case, if the correlative data indicates that the input images have been obtained by continuous imaging, the inclination order setting means determines the relative value of the probability that the inclination of a face to appear in an input image will be the same as that of the inclination of the face in a frame immediately preceding the input image to be the highest value, and sets said inclination first in the order of inclinations of faces to be detected.

Alternatively, if the correlative data indicates that the input images have been obtained by video imaging, the inclination order setting means determines the relative value of the probability that the inclination of a face to appear in an input image will be the same as the inclination of the input images to be the highest value, and sets said inclination first in the order of inclinations of faces to be detected.

"Continuous imaging" refers to repetitively obtaining images having relatively high image quality at temporal intervals longer than those employed during video imaging. For example, continuous imaging can be accomplished by photography using an imaging device, such as a digital camera, set to continuous imaging mode.

"Video imaging" refers to repetitively obtaining images at temporal intervals shorter than those employed during continuous imaging. For example, video imaging can be accomplished by photography using an imaging device, such as a digital video camera, set to movie mode.

The "inclinations" of faces refers to inclinations in the so called in-plane (within the plane of images) direction. The "inclination of the input images" refers to the vertical direction of the input images.

According to the face detecting method, face detecting apparatus, and program of the present invention, faces are detected from within input images while varying the inclination of faces to be detected. Correlative data related to the inclination of faces that appear in the input images are obtained, and the correlative data is utilized to determine the relative values of the probabilities that predetermined inclinations will appear in the input images. The order of inclinations of faces to be detected is set according to an order corresponding to the relative values of the probabilities. Therefore, the amount of processing necessary before faces are detected can be reduced, and faster face detection becomes possible.

Note that the program of the present invention may be provided being recorded on a computer readable medium. Those who are skilled in the art would know that computer readable media are not limited to any specific type of device, and include, but are not limited to: floppy disks; CD's; RAM's; ROM's; hard disks; and magnetic tapes. Additionally, the computer instructions include, but are not limited to: source; object; and executable code, and can be in any language, including higher level languages, assembly language, and machine language.

BRIEF DESCRIPTION OF THE DRAWINGS

FIG. 9 is a diagram for explaining calculation of characteristic amounts by the weak classifiers.

FIG. 12 is a diagram that illustrates a method by which histograms of the weak classifiers are derived.

FIG. 14 is a diagram for explaining switching of resolution images, which are targets of face detection, and movement of a subwindow therein.

DESCRIPTION OF THE PREFERRED EMBODIMENTS

Figure 1:
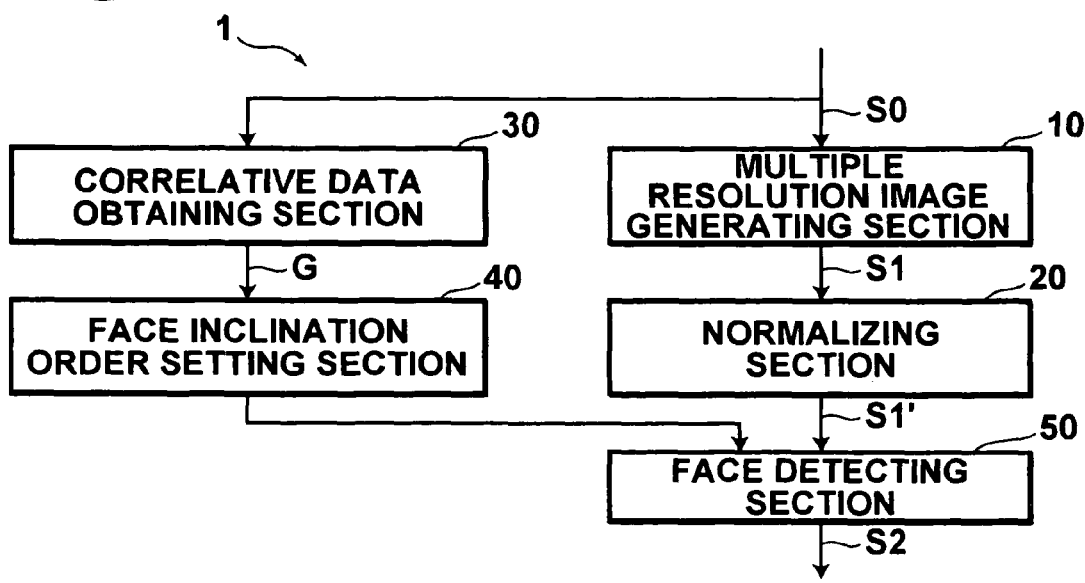
FIG. 1 is a schematic block diagram that illustrates the construction of a face detecting system.

Hereinafter, an embodiment of the present invention will be described. FIG. 1 is a schematic block diagram that illustrates the construction of a face detecting system 1, to which the face discriminating apparatus of the present invention is applied. The face detecting system 1 detects faces included in digital images, regardless of the position, the size, the inclination in in-plane directions (hereinafter, simply referred to as "inclination of the face"), and the inclination in out-of-plane directions (hereinafter, simply referred to as "facing direction") thereof. The face detecting system 1 employs a face detecting technique that utilizes classifier modules (hereinafter, simply referred to as "classifiers"), which are generated by machine learning using sample images, known as being superior in detection accuracy and robustness. In this techniques, characteristics of faces are learned by employing a facial image sample group comprising a plurality of facial image samples, in which the directions and the vertical orientations of faces are substantially matched, and a non-facial image sample group comprising a plurality of images which are known to not be of faces. This learning process generates a classifier that can judge whether an image is an image of a face in a predetermined direction and a predetermined vertical orientation. Partial images are sequentially cut out from an image, which is a target of face detection (hereinafter, referred to as "detection target image"), and the partial images are judged with the classifier, to detect faces within the detection target image.

Note that in this technique, judgment regarding whether the partial image represents a face is performed for each of the sequentially cut out partial images. Therefore, if detailed searching is attempted from the initiation of a detection process, the amount of processing becomes great, and there is a problem that face detection takes a long amount of time. In order to cause the judgment process to become more efficient in these techniques, first, a comparatively rough face detection process may be administered on the detection target image (thinning out the positions of the partial images to be sequentially cut out, for example), to extract facial image candidates. Then, a finer judgment process may be administered with respect to images in the vicinities of the extracted facial image candidates, to judge whether the facial image candidates are true facial images.

As illustrated in FIG. 1, the face detecting system 1 comprises: a multiple resolution image generating section 10; a normalizing section 20; a correlative data obtaining section 30; a face inclination order setting section 40; and a face detecting section 50.

The multiple resolution image generating section 10 converts the resolution of input images S0, which are target images in which faces are to be detected, to obtain a resolution image group S1 comprising a plurality of images (S1_1, S1_2, S1_3, ... S1_n) having different resolutions (hereinafter, referred to as "resolution images")

The multiple resolution image generating section 10 converts the resolution (image size) of the input image S0, to standardize the resolution to a predetermined resolution, for example, a rectangular image having 416 pixels along its short side, to obtain a standardized input image S0'. Then, resolution conversion is administered, using the standardized input image S0' as the basic image, to generate the resolution image group S1, comprising the plurality of resolution images S1 having different resolutions. The reason for generating the resolution image group S1 is as follows. Generally, the sizes of faces which are included in the input image S0 are unknown. However, it is necessary for the sizes of faces (image size) to be detected to be uniform, due to the configuration of classifiers, to be described later. Therefore, partial images of a predetermined size are cut out from images having different resolutions, and discriminations are performed regarding whether the partial images represent faces or subjects other than faces.

Figure 2:
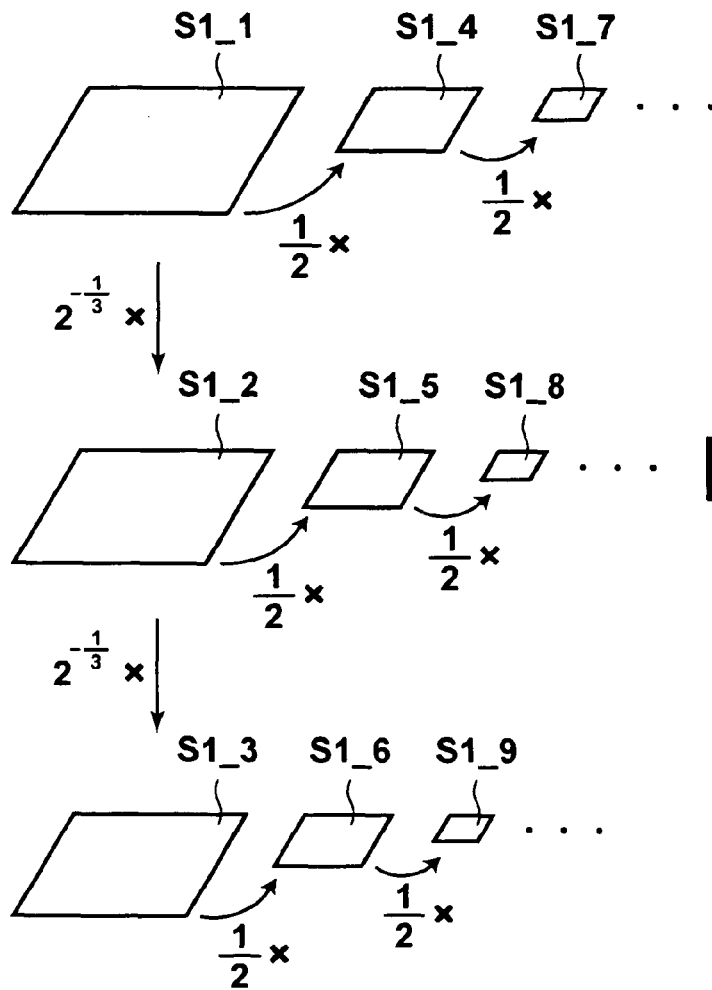
FIG. 2 is a diagram that illustrates the process by which multiple resolution images are generated for detection target images.

FIG. 2 is a diagram that illustrates the steps of the resolution conversion process administered on input images. Specifically, the standardized input image S0' is employed as a basic image S1_1, which is multiplied by $2^{-1/3}$, to obtain an image S1_2, as illustrated in FIG. 2. The image S1_2 is multiplied by $2^{-1/3}$, to obtain an image S1_3. Thereafter, reduced images S1_4, S1_5, and S1_6, which are ½ the size of the original images, are generated for each of the images S1_1, S1_2, and S1_3, respectively. Further, reduced images S1_7, S1_8, and S1_9, which are ½ the sizes of the reduced images S1_4, S1_5, and S1_6, respectively, are generated. The generation of reduced images is repeated until a predetermined number of reduced images are obtained. Reduced images, which are $2^{-1/3}$ times the resolution of ½ size reduced images, which do not require interpolation of pixel values that represent brightness, can be generated quickly by this method of reduced image generation. For example, in the case that the resolution image S1_1 is a rectangular image having a short side of 416 pixels, the resolution images S1_2, S1_3, ... will be rectangular images having short sides of 330 pixels, 262 pixels, 208 pixels, 165 pixels, 131 pixels, 104 pixels, 82 pixels, 65 pixels.... That is, a plurality of resolution images, which are reduced by $\times 2^{1/3}$ increments, can be generated. Note that the images, which are generated without interpolating pixel values, tend to bear the characteristics of the image patterns of the original images. Therefore, these reduced images are preferable from the viewpoint of improving the accuracy of the face detecting process.

The normalizing section 20 administers a global normalizing process and a local region normalizing process on each image within the resolution image group S1, such that the images within the resolution image group S1 become suited for face detection processes to be performed later. The normalizing section 20 obtains a resolution image group S1', comprising a plurality of resolution images S1' (S1'_1, S1'_2, ... S1'_n).

The global normalizing process will be described first. The global normalizing process converts the pixel values of the entirety of the resolution images according to a conversion curve (look up table). The pixel values are converted such that the contrast of the resolution images approach a predetermined level suitable of the face detecting process, that is, a level that maximizes the performance of the classifiers to be described later.

Figure 3:
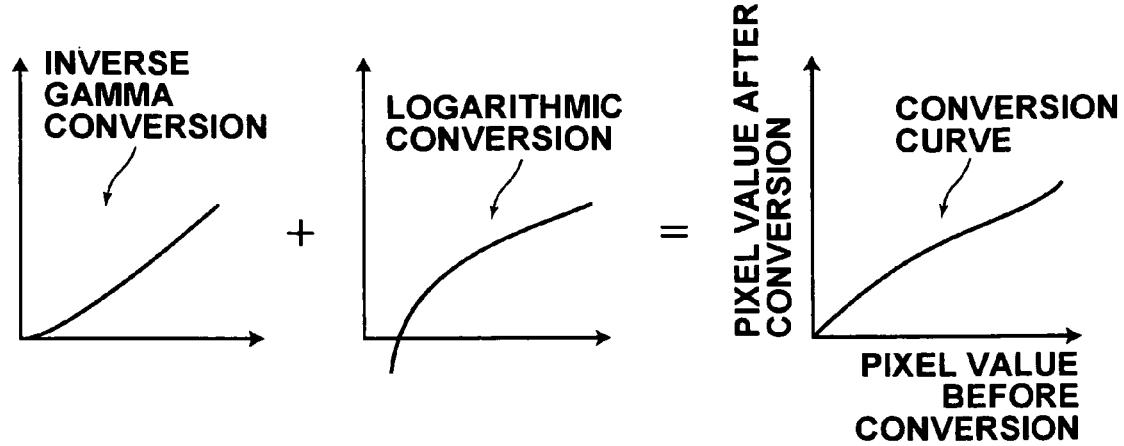
FIG. 3 illustrates an example of a conversion curve, which is employed for a global normalizing process.

FIG. 3 illustrates an example of such a conversion curve. The global normalizing process may administer inverse gamma conversion (multiply by 2.2) on the pixel values within an sRGB space, then take the logarithms of the pixel values according to the conversion curve (look up table) of FIG. 3. This process is administered for the following reasons.

Optical intensities I, which are observed as an image, is expressed as a product of the reflectance R of a subject and the intensity L of a light source (I=R×L). Accordingly, if the intensity L of the light source changes, the optical intensities I, which are observed as the image, also change. However, if only the reflectance R of the subject is evaluated, then face discrimination that does not depend on the intensity L of the light source, that is, face discrimination, which is not influenced by the brightness of an image, can be performed.

Here, in the case that the intensity of a light source is designated as L, the optical intensity observed at a portion of a subject having a reflectance R1 is designated as I1, and the optical intensity observed at a portion of the subject having a reflectance R2 is designated as I2, the logarithms of each of the values satisfy the following equation:

$$\text{Log}(I1)-\log(I2)=\log(R1\times L)-\log(R2\times L)=\log(R1)+\log(L)-(\log(R2)+\log(L))=\log(R1)-\log(R2)=\log(R1/R2)$$

That is, by administering logarithmic conversion on pixel values of an image, the pixel values are converted into a space in which the ratio of reflectances is expressed as differences. In this type of space, it becomes possible to evaluate only the reflectance of a subject, independent of the intensity L of a light source. In other words, contrast, which differs due to brightness within the image, can be matched.

Meanwhile, the color space of images obtained by devices such as digital cameras is generally an sRGB color space. sRGB is an internationally standardized color space, in which colors and chromas are defined, in order to eliminate differences in color reproduction among devices. In this color space, appropriate color reproduction is enabled in image output devices having gamma values (γ out) of 2.2. Therefore, the pixel values of images are multiplied by 1/γ out (=0.45).

Therefore, the pixel values of the pixels within the entirety of the image are converted according to the conversion curve that administers inverse gamma conversion on the pixel values, that is, multiplies the pixel values by 2.2, then takes the logarithms thereof. Thereby, it becomes possible to evaluate only the reflectance of a subject, independent of the intensity of a light source.

Note that this type of global normalizing process can be said to be a process that converts the pixel values of pixels within the entirety of an image according to a conversion curve that converts the pixel values from those of a specific color space to those of a different color space.

By administering such a process on the detection target image, contrast, which differs according to brightness within images, can be matched, and the accuracy of face detecting processes is improved. Note that the global normalizing process is characterized by having the advantage of short processing time and the drawback that it is easily influenced by oblique light and backgrounds within images.

Next, the local region normalizing process will be described. The local region normalizing process suppresses fluctuations in contrast within local regions of the resolution images. The local region normalizing process comprises: a first brightness gradation converting process and a second brightness gradation converting process to be administered on each local region of the resolution images within the resolution image group S1. The first brightness gradation converting process causes degrees of variance in pixel values representing brightness, which are greater than or equal to a first predetermined level, to approach a second predetermined level, which is higher than the first predetermined level. The second brightness gradation converting process causes degrees of variance in pixel values representing brightness, which are less than the first predetermined level, to be suppressed such that it is lower than the second predetermined level. Note that the local region normalizing process requires a large amount of processing time, but has the effect that the influence of oblique light, backgrounds, and input modalities on face detection within locally normalized images is small.

Figure 4:
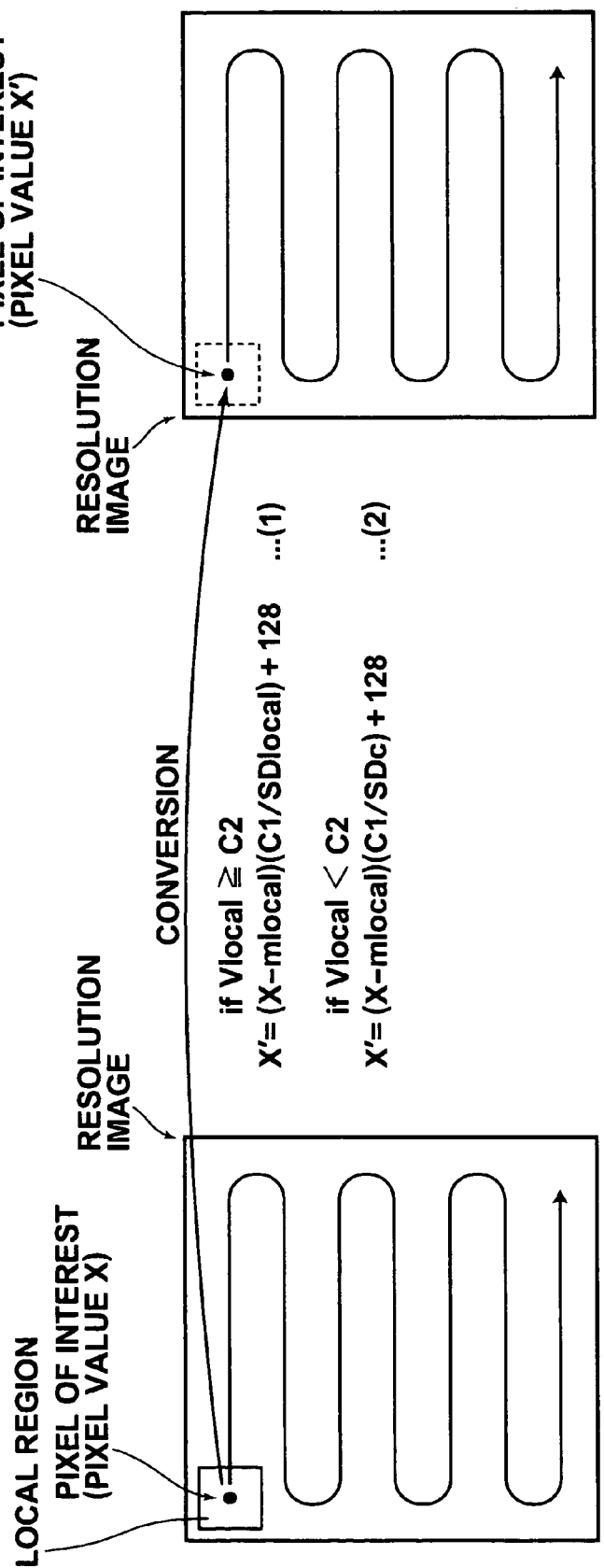
FIG. 4 is a diagram that illustrates the concept of a local region normalizing process.
Figure 5:
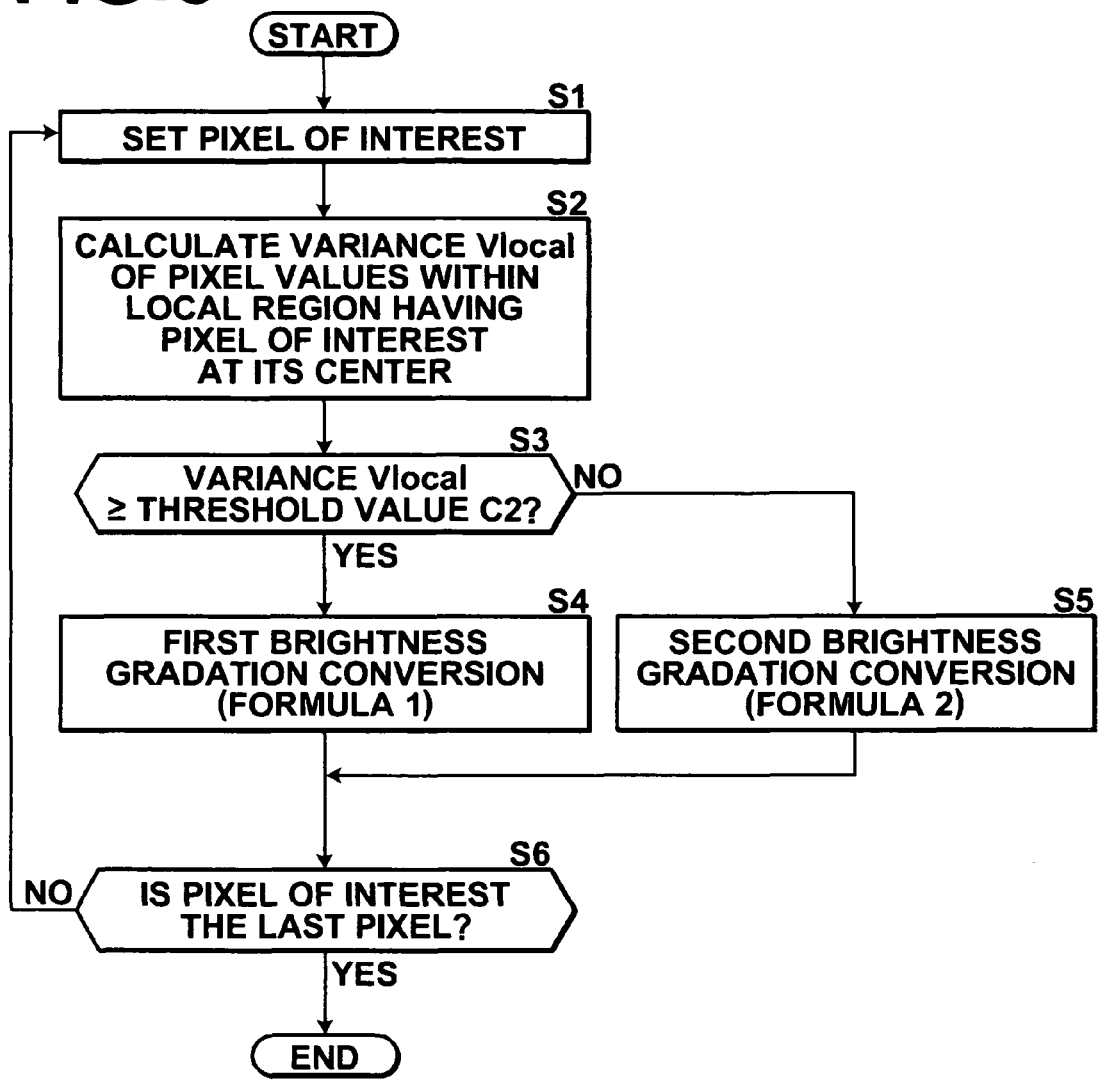
FIG. 5 is a flow chart that illustrates the processes performed by a local region normalizing section.

FIG. 4 is a diagram that illustrates the concept of a local region normalizing process, and FIG. 5 is a flow chart that illustrates the processes performed in the local region normalizing process. Formulas (1) and (2) are formulas for converting the gradations of pixel values in the local region normalizing process.

If $Vlocal \geq C2$ $$X' = (X - mlocal)(C1/SDlocal) + 128 \quad (1)$$

If $Vlocal < C2$ $$X' = (X - mlocal)(C1/SDc) + 128 \quad (2)$$

wherein:
X: pixel value of a pixel of interest;
X': pixel value after conversion;
mlocal: mean pixel value within a local region having the pixel of interest as its center;
Vlocal: variance in pixel values within the local region;
Sdlocal: standard deviation of pixel values within the local region;
(C1×C1): reference value;
C2: threshold value; and
SDc: constant Here, X represents the pixel value of a pixel of interest; X' represents the pixel value of the pixel of interest after conversion; mlocal represents a mean pixel value within a local region having the pixel of interest as its center; Vlocal represents the variance in pixel values within the local region; SD local represents the standard deviation of pixel values within the local region; (C1×C1) represents a reference value that corresponds to the second predetermined level; C2 represents a threshold value that corresponds to the first predetermined level; and SDc is a predetermined constant. Note that the number of brightness gradations is expressed as 8 bit data, and that the pixel values range from 0 to 255 in the present embodiment.

As illustrated in FIG. 5, the normalizing section 20 sets a pixel within a resolution image as a pixel of interest (step S1). Next, the variance Vlocal, among pixel values within a local region of a predetermined size, for example, 11×11 pixels, having the pixel of interest at its center, is calculated (step S2). Then, it is judged whether the calculated variance Vlocal is greater than or equal to a threshold value C2 that corresponds to the first predetermined level (step S3). In the case that the discrimination results of step S3 indicate that the variance Vlocal is greater than or equal to the threshold value C2, the first brightness gradation converting process is administered according to Formula (1) (step S4). The first brightness gradation converting process causes the difference between the pixel value X of the pixel of interest and the mean value mlocal to become smaller, as the difference between the variance Vlocal and the reference value (C1×C1) corresponding to the second predetermined level become greater when the variance Vlocal is greater than the reference value, and causes the difference between the pixel value X of the pixel of interest and the mean value mlocal to become greater, as the difference between the variance Vlocal and the reference value (C1×C1) become greater when the variance Vlocal is less than the reference value. On the other hand, in the case that the variance Vlocal is judged to be less than the threshold value C2, a linear gradation conversion, which does not depend on the variance Vlocal, is administered according to Formula (2), as the second brightness gradation converting process (step S5). Thereafter, it is judged whether the pixel of interest set in step S1 is the last pixel (step S6). If it is judged in step S6 that the pixel of interest is not the last pixel, the process returns to step 1, and a next pixel within the resolution image is set as the pixel of interest. On the other hand, if it is judged that the pixel of interest is the last pixel in step S6, the local region normalizing process for the resolution image ends. By repeating the processes performed in steps S1 through S6 in this manner, a resolution image, on which the local region normalizing process has been administered, is obtained.

Note that the first predetermined level may be varied according to the brightness of the entirety or a portion of the local regions. For example, the threshold value C2 may be varied according to the pixel value of the pixel of interest. That is, the threshold value C2 corresponding to the first predetermined level may be set to be high when the brightness of the pixel of interest is relatively high, and set low when the brightness of the pixel of interest is relatively low. By setting the threshold value C2 in this manner, faces, which are present within regions having low brightness, that is, dark regions with low contrast (a state in which the variance in pixel values is low) can also be correctly normalized.

The correlative data obtaining section 30 (correlative section obtaining means) obtains correlative data G which is related to the inclination of faces that appear in the input images S0. The correlative data G may indicate whether the input images have been obtained by continuous imaging, or whether the input images have been obtained by video imaging. In the present embodiment, data attached to the input images S0 that indicates whether the imaging mode of a digital camera or a digital video camera was set to continuous imaging or movie mode (video imaging mode) during obtainment of the input images S0 are read out.

The face inclination order setting section 40 (inclination order setting means) determines the relative values of the probabilities that faces of predetermined inclinations will appear in the input images S0 based on the correlative data obtained by the correlative data obtaining section 30. Then, the face inclination order setting section 40 sets the order of inclinations to be detected during face detection while varying the inclinations of faces to be detected, according to an order corresponding to the relative values of the probabilities.

For example, in the case that the correlative data G indicates that the input images S0 have been obtained by continuous imaging, the face inclination order setting section 40 obtains data that represents the inclination of a face which was detected in an image of the frame immediately preceding the input image S0. The relative value of the probability that the inclination of a face to appear in the input image S0 will be the same as the inclination of the face detected in the frame immediately preceding the input image S0 is determined to be the highest value. The face inclination order setting section 40 sets said inclination first in the order of inclinations of faces to be detected. The other inclinations in the order are set to inclinations close to the inclination of the face which has already been detected in the frame immediately preceding the input image S0. This is because the probability that the direction or position of subjects will change drastically between frames of an image group obtained by continuous imaging is considered to be low. Therefore, it can be judged that it is highly probable that a face of the same or a similar inclination as that of a face detected in an immediately preceding frame will be detected in the input image S0.

Alternatively, in the case that the correlative data G indicates that the input images S0 have been obtained by video imaging, the relative value of the probability that the inclination of a face to appear in the input image S0 will be the same as the inclination of the input image S0 is determined to be the highest value. The face inclination order setting section 40 sets said inclination first in the order of inclinations of faces to be detected. The other inclinations in the order are set to inclinations close to the inclination of the input image S0. This is because it is rare for video imaging to be performed with an imaging device being held sideways or inclined. Accordingly, the possibility that the orientation of subjects with respect to the input image S0 is horizontal or inverted is considered to be low. Therefore, it can be judged that it is highly probable that a face of the same or a similar inclination as that of the input image S0 will be detected in the input image S0.

Note that inclinations of faces, of which the possibility of being detected are relatively low, are assigned later orders within the order of inclinations of faces to be detected during face detection. Alternatively, detection processes for these inclinations may be omitted altogether.

Note that here, 12 inclinations at 30 degree intervals of rotation within the plane of the input images, with the vertical direction of the input images S0 as a reference, are designated as the inclinations of faces to be detected. An order of inclinations of faces to be detected is set in advance as an initial setting. For example, the initially set order may be: 0 degrees, 330 degrees, 30 degrees, 90 degrees, 60 degrees, 120 degrees, 270 degrees, 240 degrees, 300 degrees, 180 degrees, 150 degrees, and finally, 210 degrees. The first three inclinations are upwardly oriented, the second three inclinations are rightwardly oriented, the third three inclinations are leftwardly oriented, and the last three inclinations are downwardly oriented.

The face detecting section 50 administers face detecting processes on each image within the resolution image group S1', which have been normalized by the normalizing section 20. The face detecting processes are administered while varying the inclination of faces to be detected according to the order set by the face inclination order setting section 40, to detect a predetermined number of facial images S2 within the resolution images. The face detecting section 50 comprises a plurality of components.

Figure 6:
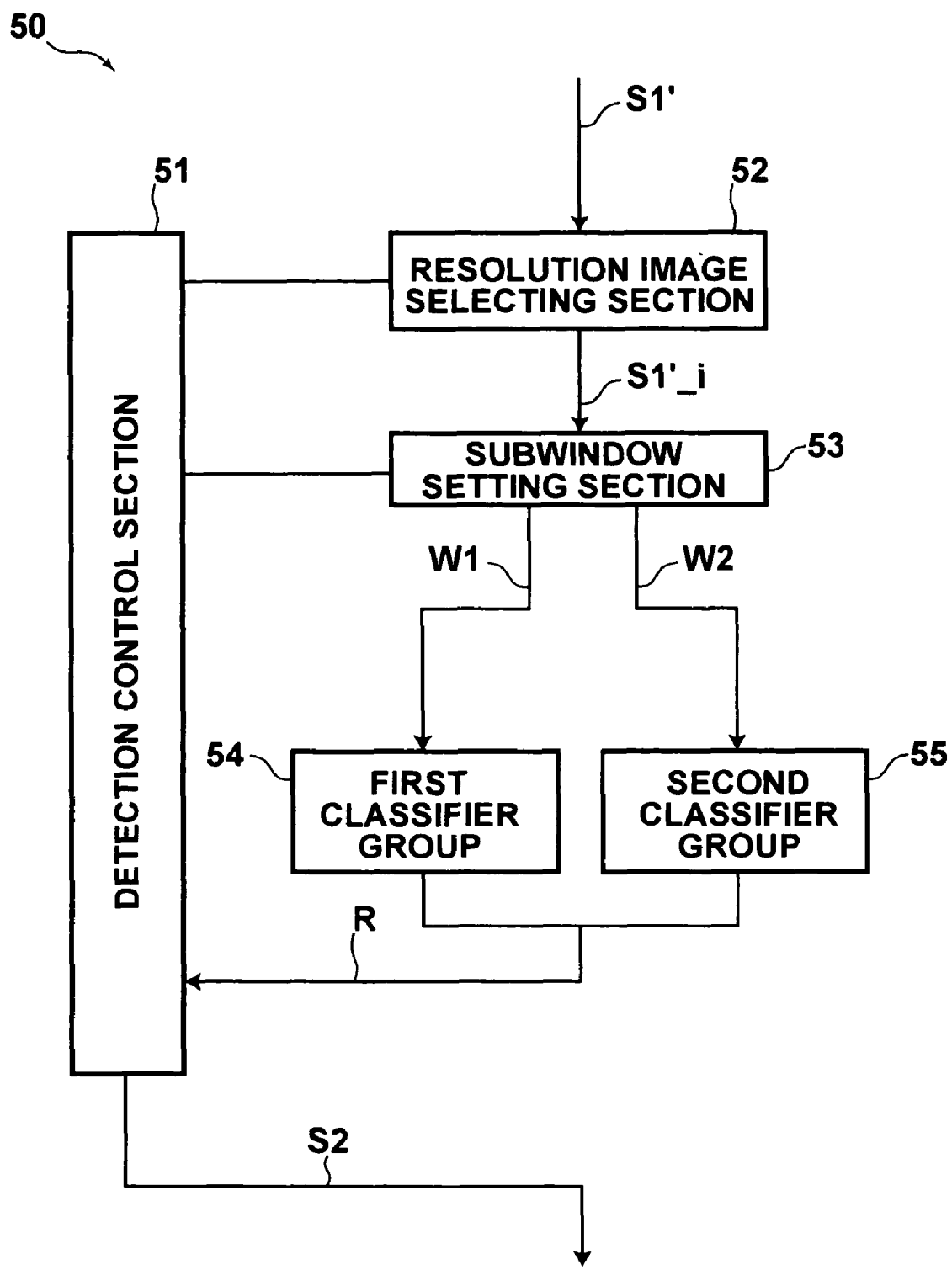
FIG. 6 is a block diagram that illustrates the construction of a face detecting section.

FIG. 6 is a block diagram that illustrates the construction of the face detecting section 50. As illustrated in FIG. 6, the face detecting section 50 comprises: a detection control section 51; a resolution image selecting section 52; a subwindow setting section 53; a first classifier group 54; and a second classifier group 55.

The detection control section 51 controls the sequence of operations of the other components of the face detecting section 50 during the face detecting processes. That is, the detection control section 51 controls the resolution image selecting section 52 and the subwindow setting section 53 to perform stepwise face detecting processes on each of the images of the resolution image group S1'. In the first step, face candidates are roughly detected, and in the second step, true facial images S2 are extracted from the face candidates. The detection control section 51 also controls the resolution image selecting section 52, the subwindow setting section 53, the first classifier group 54, and the second classifier group 55 to perform face detection while varying the inclination of faces to be detected according to the order set by the face inclination order setting section 40.

For example, the detection control section 51 commands the resolution image selecting section 52 to select a resolution image, issues subwindow setting conditions to the subwindow setting section 53, and switches the types of classifiers to be utilized, from among the classifiers that constitute the first classifier group 54 and the second classifier group 55. Note that the subwindow setting conditions include: the region on the image where the subwindow is set; the movement interval of the subwindow (roughness of detection); and the classifier group to be employed for discrimination (rough/accurate detecting mode).

The resolution image selecting section 52 sequentially selects resolution images from the resolution image group S1' from the smallest (lowest resolution) to largest (highest resolution), according to commands issued by the detection control section 51. Note that the face detecting method of the present embodiment detects faces within the input image S0, by discriminating whether the partial images W of a uniform size, which are sequentially cut out from the resolution images, are facial images. Therefore, the resolution image selecting section 52 selecting the resolution images from smaller images to larger images is equivalent to varying the setting of the size of the faces to be detected from within the input image S0 from larger to smaller sizes.

The subwindow setting section 53 sequentially sets subwindows within the resolution image selected by the resolution image selecting section 52, while moving the positions of the subwindows, based on the subwindow setting conditions set by the detection control section 51.

For example, during the initial rough detection, 32×32 pixel partial images W1 are cut out, while moving the position of the subwindow a predetermined distance, for example, 5 pixels. The subwindow setting section 53 outputs the cut out partial images W to the first classifier group 54. As will be described later, each classifier that constitutes the classifier group discriminates facial images of faces of predetermined inclinations and facing directions, respectively. This configuration enables discrimination of faces of various rotations and facing directions. In addition, when narrowing down the facial image candidates detected by the rough detection, the subwindows are sequentially set only within regions of a predetermined size in the vicinities of the facial image candidates, while being moved in smaller increments, for example, 1 pixel increments. Partial images W2 are cut out from the regions, and output to the second classifier group 55.

The first classifier group 54 and the second classifier group 55 judge whether the partial images W1 and W2 cut out by the subwindows are facial images, respectively. On the other hand, The first classifier group 54 comprises a plurality of classifiers for discriminating whether a partial image W1 is a facial image at comparatively high speeds. The first classifier group 54 is employed to roughly detect facial image candidates within the resolution images. On the other hand, the second classifier group 55 comprises a plurality of classifiers for discriminating whether a partial image W2 is a facial image with comparatively high accuracy. The plurality of classifiers are employed to perform fine detecting processes regarding the facial image candidates detected by the aforementioned rough detection, to extract true facial images S2 from the facial image candidates.

Figure 7:
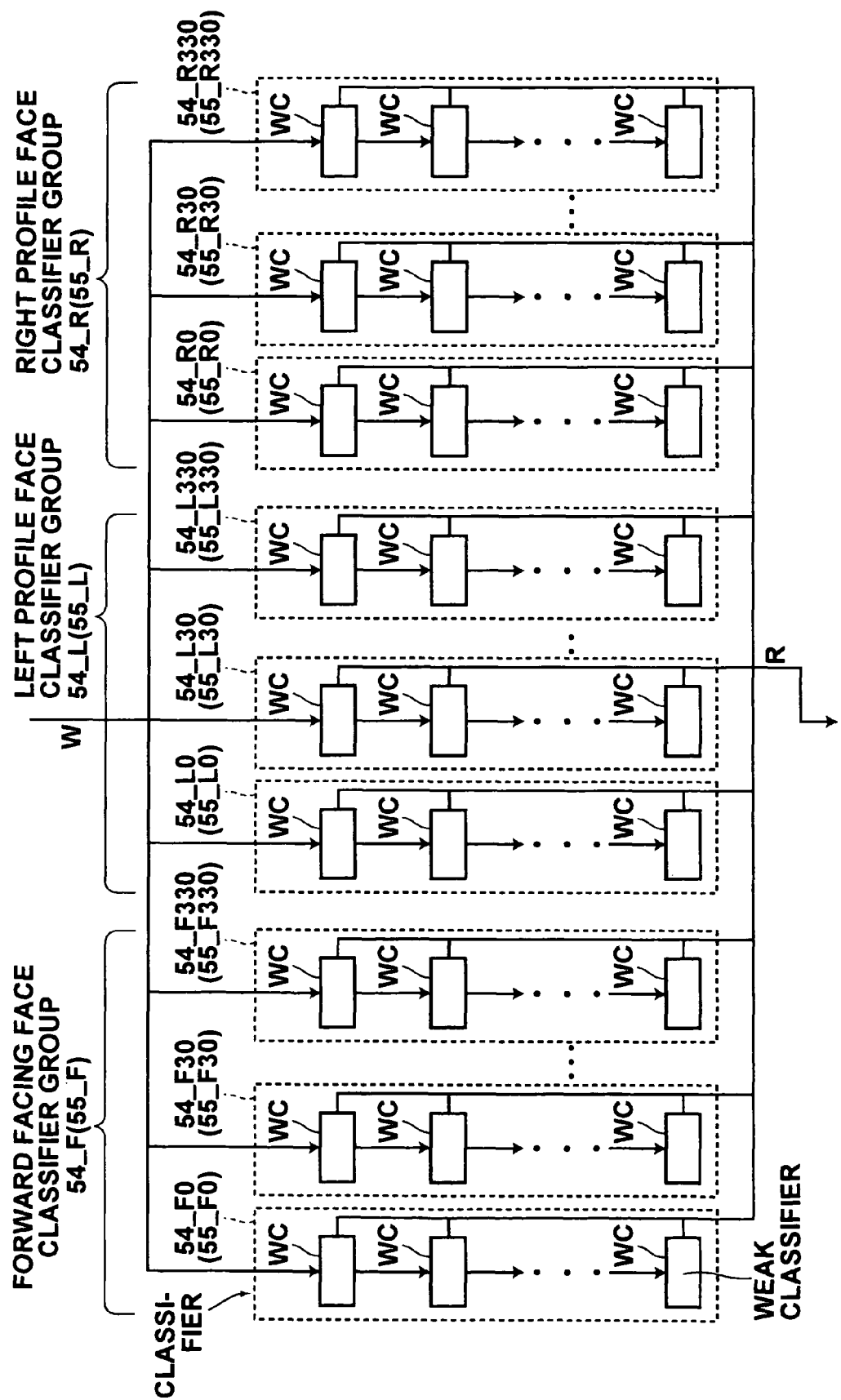
FIG. 7 is a block diagram that illustrates the construction of a first classifier group and a second classifier group.

FIG. 7 illustrates the configuration of the first classifier group 54 and the second classifier group 55. As illustrated in FIG. 7, the plurality of classifiers that constitute the first classifier group 54 include different types of classifiers, respectively capable of discriminating faces facing different directions. That is, the plurality of classifiers comprises: a forward facing face classifier group 54_F, for discriminating forward facing faces; a left profile face classifier group 54_L, for discriminating left profiles of faces; and a right profile face classifier group 54_R, for discriminating right profiles of a faces. The classifier groups 54_F, 54_L, and 54_R are connected in parallel. Further, each of the three classifier groups 54_F, 54_L, and 54_R comprise twelve classifiers capable of detecting faces which are rotated over 360 degrees, in 30 degree increments. That is, the first forward facing face classifier group 54_F comprises a classifier 54_F0, a classifier 54_F30, a classifier 54_F60, . . . and a classifier 54_F330; the first left profile face classifier group 54_L comprises a classifier 54_L0, a classifier 54_L30, a classifier 54_L60 . . . and a classifier 54_L330; and the first right profile classifier group 54_R comprises a classifier 54_R0, a classifier 54_R30, a classifier 54_R60, . . . and a classifier 54_R330.

The plurality of classifiers that constitute the first classifier group 55 also include different types of classifiers, respectively capable of discriminating faces facing different directions. That is, the plurality of classifiers comprises: a forward facing face classifier group 55_F, for discriminating forward facing faces; a left profile face classifier group 55_L, for discriminating left profiles of faces; and a right profile face classifier group 55_R, for discriminating right profiles of a faces. The classifier groups 55_F, 55_μL, and 55_R are connected in parallel. Further, each of the three classifier groups 55_F, 55_L, and 55_R comprise twelve classifiers capable of detecting faces which are rotated over 360 degrees, in 30 degree increments. That is, the second forward facing face classifier group 55_F comprises a classifier 55_F0, a classifier 55_F30, a classifier 55_F60, . . . and a classifier 55_F330; the second left profile face classifier group 55_L comprises a classifier 55_L0, a classifier 55_L30, a classifier 55_L60, . . . and a classifier 55_L330; and the second right profile classifier group 55_R comprises a classifier 55_R0, a classifier 55_R30, a classifier 55_R60, . . . and a classifier 55_R330.

Note that each of the aforementioned classifiers comprises a plurality of weak classifiers WC, which are linearly linked in a cascade structure, as illustrated in FIG. 7. The weak classifiers calculate at least one characteristic amount related to the pixel value (brightness) distributions of the partial images W1 or W2 (hereinafter, collectively referred to as "partial images W"), and employ the at least one characteristic amount to discriminate whether the partial images W are facial images.

The first classifier group 54 and the second classifier group 55 discriminate whether each of the sequentially input partial images W are forward facing faces, left profiles of faces, or right profiles of faces, by employing the three types of classifiers. Note that classifiers for discriminating leftward obliquely facing faces and rightward obliquely facing faces may further be provided, to improve the detection accuracy for obliquely facing faces.

Here, the specific processes performed by each of the classifiers and the learning method of the classifiers will be described.

Each classifier comprises a plurality of weak classifiers WC. Weak classifiers EC which are effective in judgment are selected from the great number of weak classifiers WC by the learning process to be described later. The classifiers are constituted by connecting the selected weak classifiers WC in series in the order of their effectiveness. Each weak classifier calculates a characteristic amount from the partial images W according to an algorithm unique thereto. Then, the weak classifier derives a score that represents the probability that the partial images W are images of faces of predetermined inclinations and facing directions, based on the characteristic amount and a predetermined score table (a histogram to be described later). The classifiers evaluate the scores obtained from all or a portion of the weak classifiers WC, to obtain discrimination results R that represent whether the partial images are facial images of predetermined inclinations and facing directions.

Figure 8:
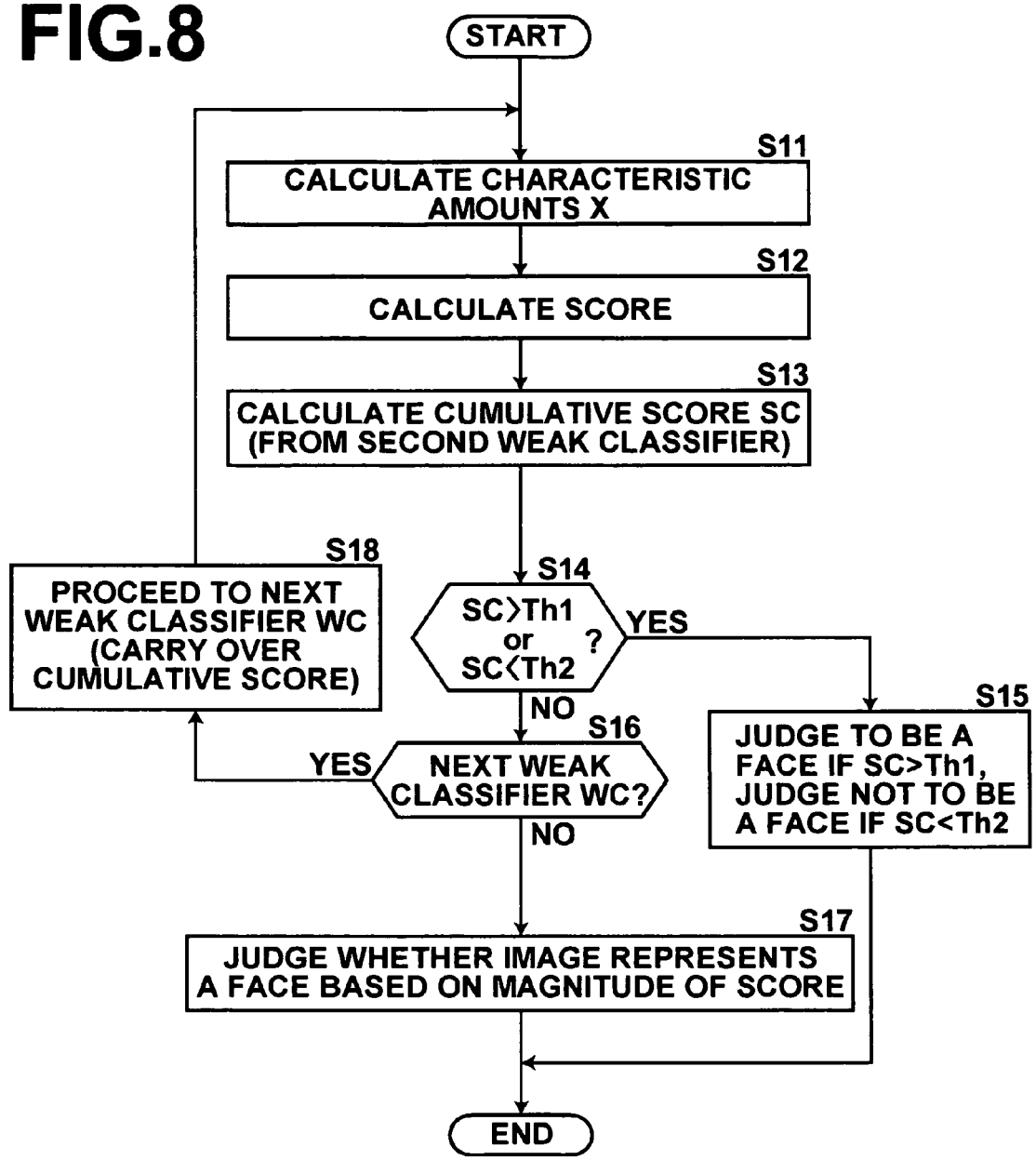
FIG. 8 is a flow chart that illustrates an outline of the processes performed by a classifier.

FIG. 8 is a flow chart that illustrates an outline of the processes performed by each of the classifiers. First, a first weak classifier WC calculates characteristic amounts x of a partial image W which is input thereto (step S11). Specifically, the weak classifier WC obtains a 16×16 pixel size image and an 8×8 pixel size image as illustrated in FIG. 9, by administering a four neighboring pixel average process on a 32×32 pixel size partial image W, twice. The four neighboring pixel average process sections the partial image into 2×2 pixel blocks, and assigns the average pixel values of the four pixels within the blocks as the pixel value of pixels that correspond to the blocks. Pairs of points are set within the three images. The differences between the pixel values (brightness) of points of each pair within a pair group constituted by a plurality of different types of pairs are calculated, and the combinations of the differences are designated to be the characteristic amounts. The two points that constitute each pair may be two predetermined points which are aligned in the vertical direction or the horizontal direction so as to reflect density characteristics of faces within images. The characteristic amounts x are calculated as values that correspond to the combinations of the differences. A score is calculated based on the characteristic amounts x, by referring to a predetermined score table (histogram) (step S12). The score represents the probability that the partial image W represents a face to be discriminated by the weak classifier WC (for example, in the case of classifier 54_F30, the score represents the probability that the partial image W represents a forward facing face inclined 30 degrees). The calculated score is added to a score which has been calculated by the immediately preceding weak classifier, to calculate a cumulative score SC (step S13). However, the first weak classifier WC does not have a preceding weak classifier, and therefore, the score calculated by itself is designated to be the cumulative score SC. Whether the partial image W represents a face is discriminated, based on whether the cumulative score SC is greater than a first predetermined threshold value Th1 and whether the cumulative score SC is less than a second predetermined threshold value Th2 (step S14). That is, it is judged whether the condition SC>Th1 or the condition SC<Th2 is satisfied. When it is judged that one of the two conditions is satisfied, in the case that SC>Th1, the partial image W is discriminated to be a "facial image", and in the case that SC<Th2, the partial image W is discriminated to be a "non-facial image" (step S15), and the process ends. If it is judged in step S14 that the cumulative score SC does not satisfy either of the above two conditions, whether a next weak classifier WC exists is judged (step S16). If a next weak classifier WC exists, the cumulative score SC is input to the next weak classifier WC, and processing is performed by the next weak classifier WC. On the other hand, if it is judged in step S16 that a next weak classifier WC does not exist, the partial image W is discriminated to be either a "facial image" or a "non-facial image", based on the magnitude of the calculated cumulative score SC (step S17), and the process ends.

Next, the learning method (generating method) of the classifiers will be described. Note that the learning process is performed for each type of classifier, that is, for each direction that the faces to be detected are facing and for each rotational angle thereof.

A sample image group, which is the subject of learning, comprises a plurality of sample images, which are known to be of faces, and a plurality of sample images, which are known to not be of faces. The sample images are standardized to be of a predetermined size, for example, 32×32 pixels. Note that in the sample images, which are known to be of faces, the direction that the faces to be detected by each classifier are facing are matched, as well as the vertical orientations thereof. Variations of each sample image, which are known to be of faces, are employed. That is, the vertical and/or horizontal dimensions of each sample image are enlarged/reduced at 0.1× increments within a range of 0.7× to 1.2×. Each of the enlarged/reduced sample images are also rotated in three degree increments within a range of ±15 degrees within the planes thereof. Note that at this time, the sizes and positions of the sample images of faces are standardized such that the eyes therein are at predetermined positions. The enlargement/reduction and rotation are performed with the positions of the eyes as the reference points. For example, in the case of a sample image in which a forward facing face is pictured, the size and the position of the face are standardized such that the positions of the eyes are d/4 down and d/4 toward the interior from the upper left and upper right corners of the image, as illustrated in FIG. 14. The rotation and enlargement/reduction are performed with the center point between the eyes as the center of the image.

36 sample image groups are prepared for twelve of each of the three types of faces, comprising forward facing faces, left profile faces, and right profile faces, in 30 degree increments of rotation. The 36 types of facial image sample groups and a non-facial image sample group are employed to perform learning for each type of classifier, to generate 36 types of classifiers. Hereinafter, a specific learning method will be described.

Figure 10:
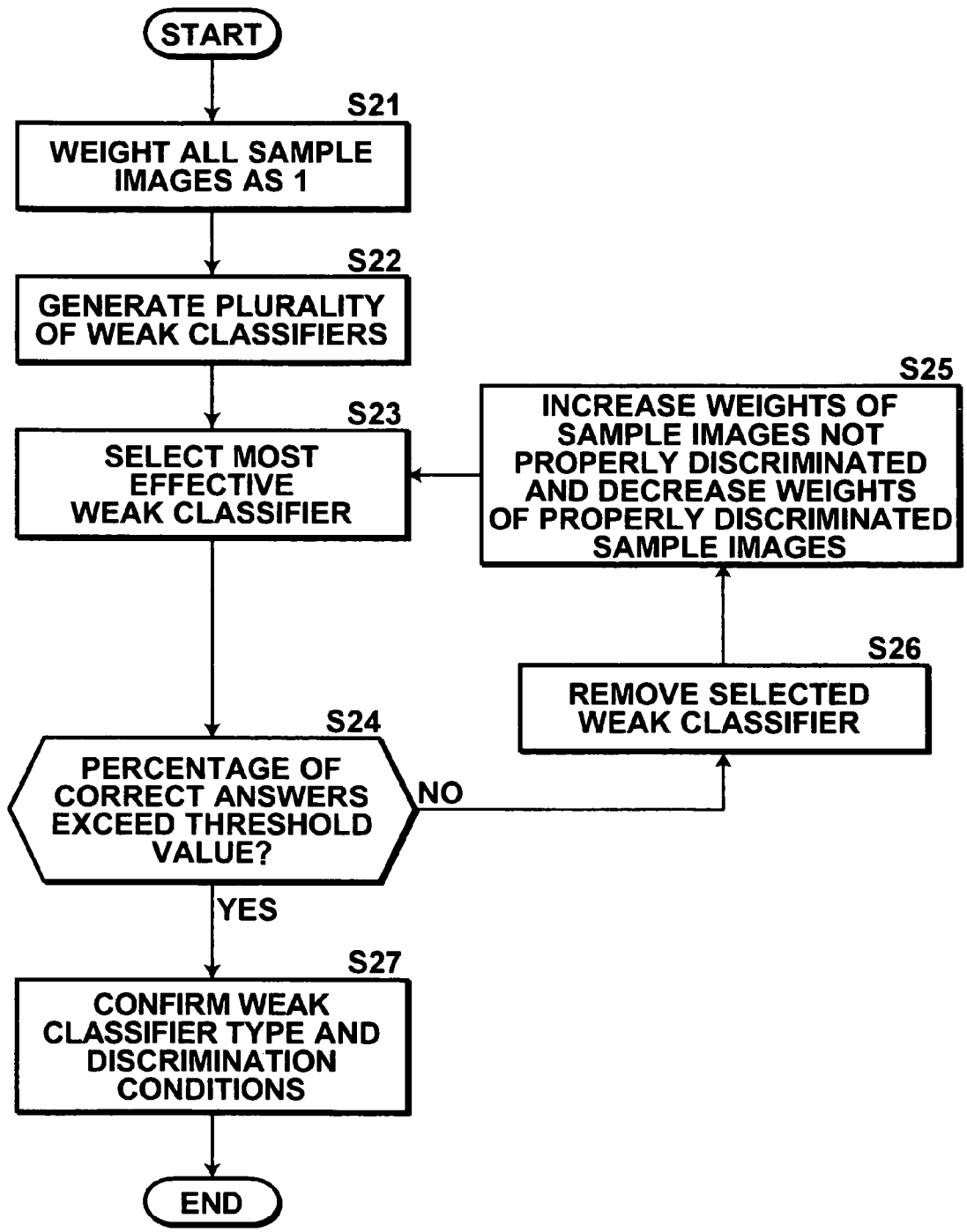
FIG. 10 is a flow chart that illustrates a learning method of the classifier.

FIG. 10 is a flow chart that illustrates a learning method of the classifiers. Note that the sample images that constitute the facial image sample groups and the non-facial image sample group have undergone a global normalizing process equivalent to that performed by the global normalizing section 20.

Each sample image is weighted, that is, is assigned a level of importance. First, the initial values of weighting of all of the sample images are set equally to 1 (step S21).

Next, weak classifiers are generated for each of a plurality of different pair groups, constituted by pairs of points which are set within the planes of the sample images and the enlarged/reduced sample images (step S22). Here, each weak classifier has a function of providing a reference to discriminate images of faces from those not of faces, by employing combinations of the differences between pixel values (representing brightness) of each pair of points that constitute the pair group. In the present embodiment, histograms of combinations of the differences between each pair of points that constitutes a single pair group are utilized as the bases for score tables for each weak classifier.

Figure 11:
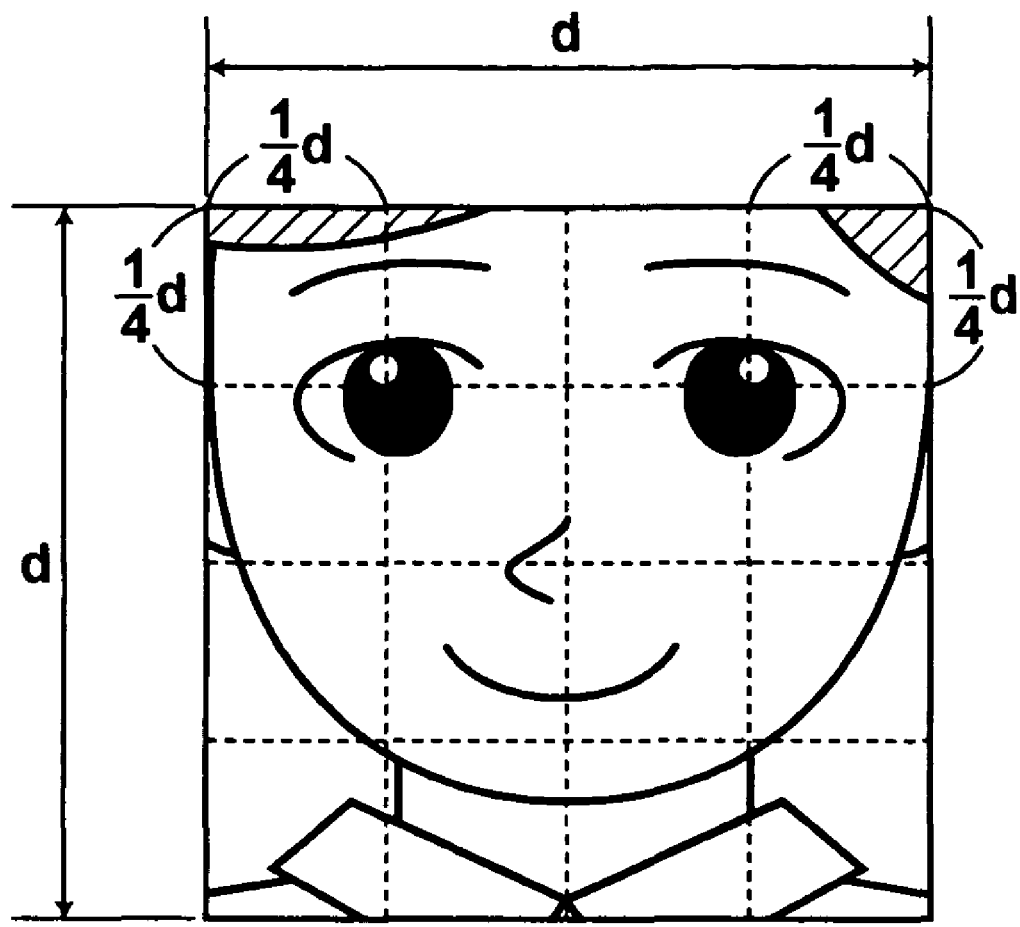
FIG. 11 illustrates a sample image, which has been standardized such that eyes pictured therein are at predetermined positions.

The generation of a weak classifier will be described with reference to FIG. 11. As illustrated in the sample images at the left side of FIG. 11, the pairs of points that constitute the pair group for generating the weak classifier are five pairs, between points P1 and P2, P1 and P3, P4 and P5, P4 and P6, and P6 and P7, within sample images which are known to be of faces. The point P1 is located at the center of the right eye, the point P2 is located within the right cheek, and the point P3 is located within the forehead of the sample images. The point P4 is located at the center of the right eye, and the point P5 is located within the right cheek, of a 16×16 pixel size image, obtained by administering the four neighboring pixel average process on the sample image. The point P5 is located at the center of the right eye, and the point P7 is located within the right cheek, of an 8×8 pixel size image, obtained by administering the four neighboring pixel average process on the 16×16 pixel size image. Note that the coordinate positions of the pairs of points that constitute a single pair group for generating a single weak classifier are the same within all of the sample images. Combinations of the differences between the pixel values of each of the five pairs of points that constitute the pair group are calculated for all of the sample images, and a histogram is generated. Here, the values of the combinations of differences between pixel values depend on the number of brightness gradations. In the case that the number of brightness gradations is expressed as 16 bit data, there are 65536 possible differences for each pair of pixel values. Therefore, there are 65536 to the (number of pairs) power, as total possible values of the combinations. In this case, there are $65536^5$ possible values, which would require a great number of samples, a great amount of time, and a great amount of memory to execute learning and detection. Therefore, in the present embodiment, the differences between the pixel values are sectioned at appropriate widths of numerical values, to quantify them into n values (n=100, for example).

Thereby, the number of combinations of differences between pixel values becomes $n^5$, and the amount of data that represents the differences between pixel values can be reduced.

In a similar manner, histograms are generated for the plurality of sample images, which are known to not be of faces. Note that in the sample images, which are known to not be of faces, points (denoted by the same reference numerals P1 through P7) at positions corresponding to the pixels P1 through P7 of the sample images, which are known to be of faces, are employed in the calculation of the differences between pixel values. Logarithms of the ratios of the frequencies in the two histograms are represented by the rightmost histogram illustrated in FIG. 11, which is employed as the basis for the score table of the weak classifier. The values along the vertical axis of the histogram of the weak classifier will be referred to as discrimination points. According to the weak classifier, images that have distributions of the combinations of differences between pixel values corresponding to positive discrimination points therein are highly likely to be of faces. The likelihood that an image is of a face increases with an increase in the absolute values of the discrimination points. On the other hand, images that have distributions of the combinations of differences between pixel values corresponding to negative discrimination points are highly likely to not be of faces. Again, the likelihood that an image is not of a face increases with an increase in the absolute values of the negative discrimination points. A plurality of weak classifiers are generated in histogram format regarding combinations of the differences between pixel values of pairs of the plurality of types of pair groups in step S22.

Thereafter, a weak classifier, which is most effective in discriminating whether an image is of a face, is selected from the plurality of weak classifiers generated in step S22. The selection of the most effective weak classifier is performed while taking the weighting of each sample image into consideration. In this example, the percentages of correct discriminations provided by each of the weak classifiers are compared, and the weak classifier having the highest weighted percentage of correct discriminations is selected (step S23). At the first step S23, the weighting of all of the sample images is equal, at 1. Therefore, the weak classifier that correctly discriminates whether sample images are of faces with the highest frequency is selected as the most effective weak classifier. On the other hand, the weighting of each of the sample images is renewed at step S25, to be described later. Thereafter, the process returns to step S23. Therefore, at the second step S23, there are sample images weighted with 1, those weighted with a value less than 1, and those weighted with a value greater than 1. Accordingly, during evaluation of the percentage of correct discriminations, a sample image, which has a weighting greater than 1, is counted more than a sample image, which has a weighting of 1. For these reasons, from the second and subsequent step S23's, more importance is placed on correctly discriminating heavily weighted sample images than lightly weighted sample images.

Next, confirmation is made regarding whether the percentage of correct discriminations of a combination of the weak classifiers which have been selected, that is, weak classifiers that have been utilized in combination (it is not necessary for the weak classifiers to be linked in a linear configuration in the learning stage) exceeds a predetermined threshold value (step S24). That is, the percentage of discrimination results regarding whether sample images are of faces, which are obtained by the combination of the selected weak classifiers, that match the actual sample images is compared against the predetermined threshold value. Here, the sample images, which are employed in the evaluation of the percentage of correct discriminations, may be those that are weighted with different values, or those that are equally weighted. In the case that the percentage of correct discriminations exceeds the predetermined threshold value, whether an image is of a face can be discriminated by the selected weak classifiers with sufficiently high accuracy, therefore the learning process is completed. In the case that the percentage of correct discriminations is less than or equal to the predetermined threshold value, the process proceeds to step S26, to select an additional weak classifier, to be employed in combination with the weak classifiers which have been selected thus far.

The weak classifier, which has been selected at the immediately preceding step S23, is excluded from selection in step S26, so that it is not selected again.

Next, the weighting of sample images, which were not correctly discriminated by the weak classifier selected at the immediately preceding step S23, is increased, and the weighting of sample images, which were correctly discriminated, is decreased (step S25). The reason for increasing and decreasing the weighting in this manner is to place more importance on images which were not correctly discriminated by the weak classifiers that have been selected thus far. In this manner, selection of a weak classifier which is capable of correctly discriminating whether these sample images are of a face is encouraged, thereby improving the effect of the combination of weak classifiers.

Thereafter, the process returns to step S23, and another effective weak classifier is selected, using the weighted percentages of correct discriminations as a reference.

The above steps S23 through S26 are repeated to select weak classifiers corresponding to combinations of the differences between pixel values for each pair that constitutes specific pair groups, which are suited for discriminating whether faces are included in images. If the percentages of correct discriminations, which are evaluated at step S24, exceed the threshold value, the type of weak classifier and discrimination conditions, which are to be employed in discrimination regarding whether images include faces, are determined (step S27), and the learning process is completed. In addition, a score table, for calculating scores according to combinations of differences between pixel values, is generated for each weak classifier, based on the histograms therefor. Note that the histograms themselves may be employed as the score tables. In this case, the discrimination points of the histograms become the scores.

The aforementioned 36 types of classifiers are generated, by performing learning with each facial image sample group in this manner.

Note that in the case that the learning technique described above is applied, the weak classifiers are not limited to those in the histogram format. The weak classifiers may be of any format, as long as they provide references to discriminate between images of faces and other images by employing combinations of the differences between pixel values of each pair that constitutes specific pair groups. Examples of alternative weak classifiers are: binary data, threshold values, functions, and the like. As a further alternative, a histogram that represents the distribution of difference values between the two histograms illustrated in the center of FIG. 11 may be employed, in the case that the weak classifiers are of the histogram format.

The learning technique is not limited to that which has been described above. Other machine learning techniques, such as a neural network technique, may be employed.

Figure 13A:
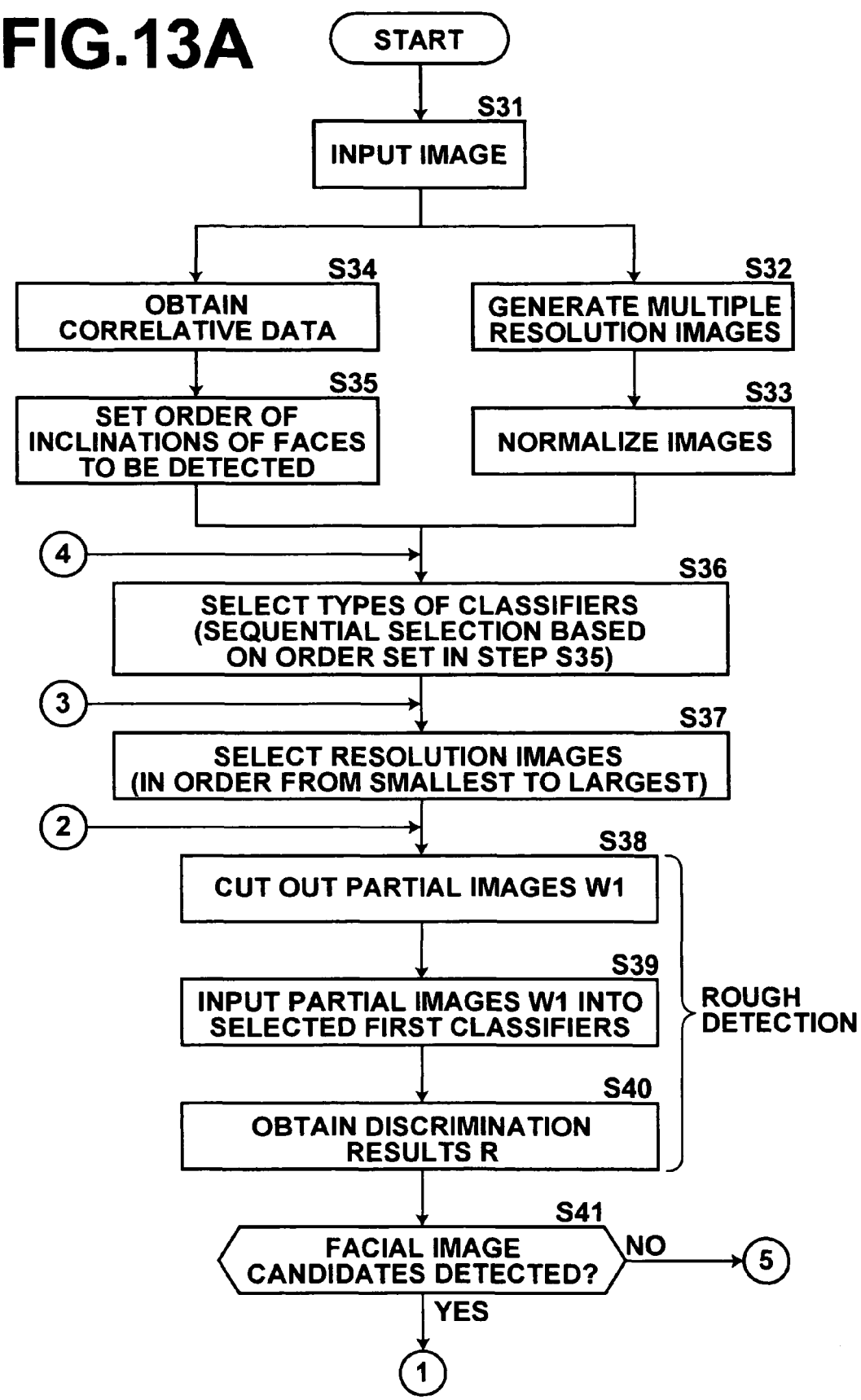
FIGS. 13A and 13B illustrate a flow chart that illustrates the processes performed by the face detecting system.
Figure 13B:
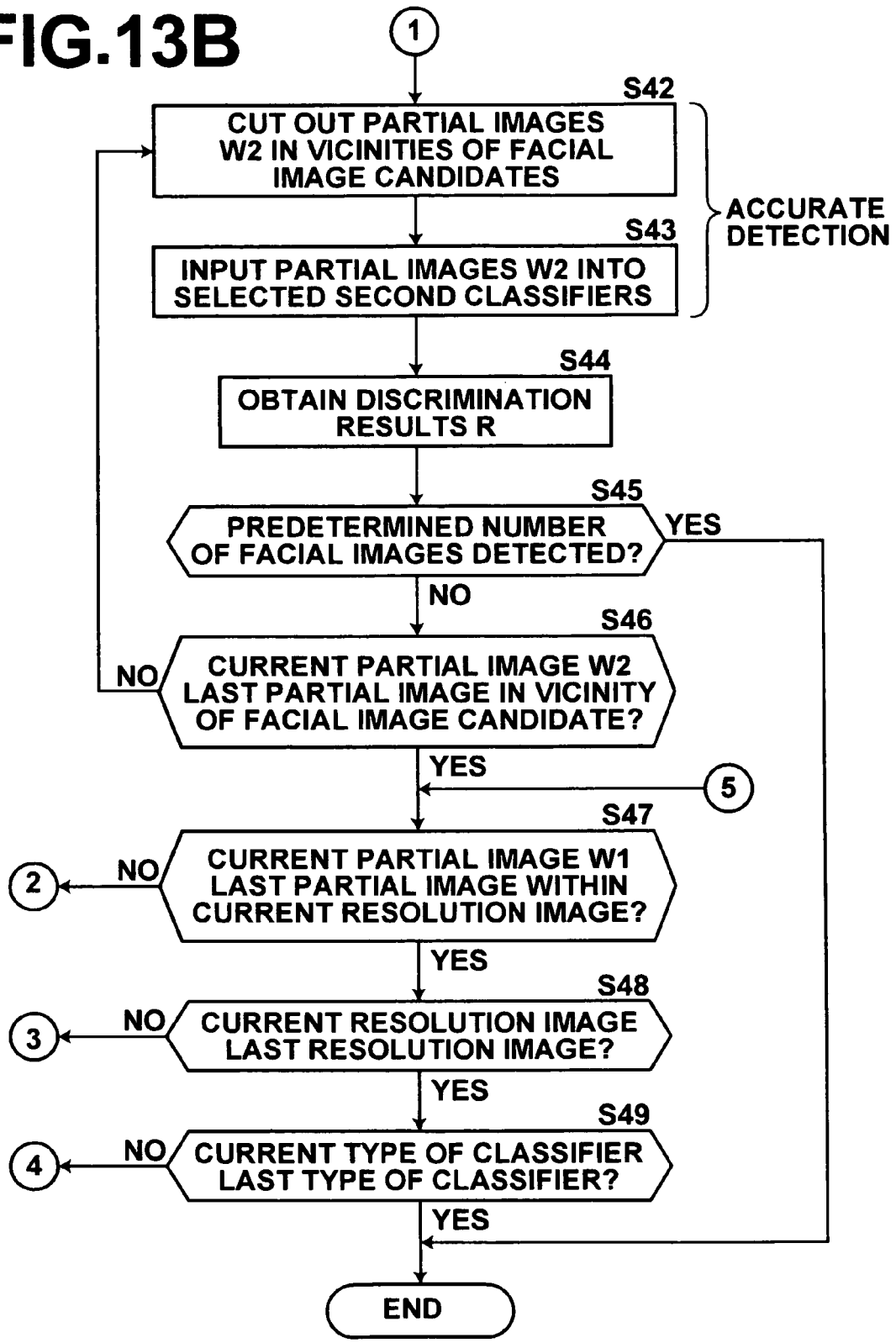

Next, the flow of processes in the face detecting system 1 will be described. FIGS. 13A and 13B illustrate a flow chart that illustrates the processes performed by the face detecting system 1. As illustrated in FIGS. 13A and 13B, when an input image S0 is input (step S31) to the multiple resolution image generating section 10, the input image S0 is converted to an image S0' of the predetermined size, and the resolution image group S1, constituted by a plurality of resolution images that decrease in resolution by factors of $2^{-1/3}$, are generated from the image S0' (step S32). Next, the normalizing section 20 administers the global normalizing process and the local region normalizing process on each resolution image of the resolution image group S1, thereby obtaining the normalized resolution image group S1' (step S33).

Meanwhile, the correlative data obtaining section 30 reads out data that represents the imaging mode of an imaging device when the input image S0 was obtained from data attached thereto, as the correlative data G (step S34). The face inclination order setting section 40 determines the relative values of the probabilities that faces of predetermined inclinations will appear in the input image S0 based on the correlative data G. Then, the face inclination order setting section 40 sets the order of inclinations to be detected during face detection while varying the inclinations of faces to be detected, according to an order corresponding to the relative values of the probabilities (step 35). Note that in the case that the correlative data G cannot be obtained, the order of inclinations of faces to be detected is the order according to the initial setting.

The detection control section of the face detecting section 50 selects the types of classifiers to discriminate whether the partial images W1 are facial images such that the classifiers match the order of inclinations of faces to be detected set by the face inclination order setting section 40 (step S36). The resolution image selecting section 52 of the face detecting section 50 sequentially selects resolution images from the normalized resolution image group S1', in order from smallest to largest, that is, in the order: S1'_n, S1'_n−1, S1'_n−2, . . . S1'_1, according to commands issued by the detection control section 51 (step S37). Next, the detection control section 51 sets subwindow setting conditions to perform detection in a rough detection mode. According to this setting, the subwindow setting section 53 sequentially cuts out partial images W1 (step S38) of a predetermined size while moving the subwindow at a wide pitch, for example, 5 pixels, and outputs the partial images W1 to the classifiers selected by the detection control section 50 from among the first classifier group 54 (step S39). For example, if the inclination of faces to be detected is 30 degrees rotated from the vertical direction of the input image S0, the partial images W1 are input to the classifiers 54F_30, 54L_30, and 54R_30. The classifiers discriminate whether the input partial images W1 are facial images, and outputs discrimination results R to the detection control section 51 (step S40). Thereafter, the detection control section 51 judges whether facial image candidates have been detected (step S41). In the case that it is judged that facial candidates have been detected, the process proceeds to step S42 to perform detection in accurate detection mode. In the case that the it is judged that facial image candidates have not been detected, the process proceeds to step S47, and judgment regarding whether detection processes can be continued is performed.

In step S42, the detection control section 51 sets the subwindow setting conditions such that the detection target regions are limited to regions of predetermined sizes that include the facial image candidates, and sets the detection mode to accurate detection mode. According to these settings, the subwindow setting section 53 sequentially cuts out partial images W2 of a predetermined size in the vicinity of the facial image candidate while moving the subwindow at a narrow pitch, for example, 1 pixel, and outputs the partial images W2 to the classifiers selected in step 36 from among the second classifier group 55. Then, the selected classifiers of second classifier group 55 discriminates whether the partial image W2 are facial images, and outputs the discrimination results R to the detection control section 51 (step S44). Thereafter, the detection control section 51 judges whether a predetermined number of facial images has been detected (step 45). In the case that it is judged that the predetermined number of facial images has been detected, the detection processes end. In the case that it is judged that the predetermined number of facial images has not been detected, whether the currently cut out partial image W2 is the last partial image is judged (step S46). In the case that the partial image W2 is judged not to be the last partial image, the process returns to step S32, and new partial images W2 are cut out, to continue detection processes in the accurate detection mode. In the case that it is judged that the partial image W2 is the last partial image, the process proceeds to step S47, and judgment regarding whether detection processes can be continued is performed.

At step S47, whether the currently cut out partial image W1 is the last partial image of the current resolution image is judged (step S47). Here, in the case that the partial image W1 is judged not to be the last partial image, the process returns to step S38, and new partial images W1 are cut out to continue detection processes. On the other hand, in the case that it is judged that the current partial image W1 is the last partial image, the process proceeds to a next discriminating process. That is, the process proceeds to step S48, to judge whether the currently selected resolution image is the last resolution image (step S48). In the case that it is judged that the current resolution image is not the last resolution image, the process returns to step S37, and a new resolution image is selected, to continue detection processes. On the other hand, in the case that it is judged that the current resolution image is the last resolution image, whether the currently selected type of classifier (inclination of faces to be detected) is the last type of classifier in the order set by the face inclination order setting section 40 (step S49). Here, in the case that it is judged that the currently selected type of classifier is not the last type of classifier in the order, the process returns to step S36, and the next type of classifier in the order is selected, to continue the detection processes. On the other hand, in the case that it is judged that the currently selected type of classifier is the last type of classifier in the order, the detection processes end.

FIG. 14 illustrates the manner in which the processes from step S37 through step S49 are repeated, to select resolution images in order from smallest to largest, cut out partial images W1 from the resolution images, and to execute face detection.

According to the face detecting system of the present embodiment, faces are detected from within input images S0 while varying the inclination of faces to be detected. Correlative data G related to the inclination of faces that appear in the input images S0 are obtained, and the correlative data G is utilized to determine the relative values of the probabilities that predetermined inclinations will appear in the input images. The order of inclinations of faces to be detected is set according to an order corresponding to the relative values of the probabilities. Therefore, the amount of processing necessary before faces are detected can be reduced, and faster face detection becomes possible.

A face detecting system according to an embodiment of the present invention have been described above. A program that causes a computer to execute the processes administered by the face detecting system is also an embodiment of the present invention. Further, computer readable media in which the program is recorded are also embodiments of the present invention.

What is claimed is:

1. A face detecting method, for detecting faces while varying the inclination of faces to be detected in each frame of video images or each of a plurality of continuous images, which are input images, comprising:
   an information obtaining step, for obtaining information regard whether the input images are those obtained by continuous imaging or those obtained by video imaging; and
   an order setting step, for determining relative values of the probabilities that faces of predetermined inclinations will appear in each frame of video images or each image of the plurality of continuous images based on the obtained information, and setting the order of inclinations of faces to be detected according to an order corresponding to the relative values of the probabilities, wherein, in the case that the obtained information indicates that the input images are those obtained by continuous imaging, in the order setting step, the relative value of the probability that an inclination of a face same as an inclination of a face detected in an immediately preceding image appears in a continuous image which is a target of face detection is determined to be the highest, the inclination determined to have the highest relative value of the probability is set as the highest ordered inclination in the continuous image which is a target of face detection, and priorities for other inclination are set in the order that they are similar to the highest ordered inclination, and wherein, in the case that the obtained information indicates that the input images are those obtained by video imaging, in the order setting step, the relative value of the probability that an inclination of a face same as an inclination of a frame which is a target of face detection appears in the frame which is a target of a face detection is determined to be the highest, the inclination determined to have the highest relative value of the probability is set as the highest ordered inclination in the frame which is a target of a face detection, and priorities for other inclinations are set in the order that they are similar to the highest ordered inclination.

2. The face detecting method as recited in claim 1, wherein, in the order setting step, the priority of other inclinations are set by rotating a reference inclination in increments of predetermined angles within the planes of the frame or continuous image which is the target of face detection, the reference inclination being the inclination which has been set as the highest ordered inclination.

3. A face detecting apparatus for detecting faces while varying the inclination of faces to be detected in each frame of video images or each of a plurality of continuous images, which are input images, comprising:

an information obtaining means, for obtaining information regard whether the input images are those obtained by continuous imaging or those obtained by video imaging; and a face inclination order setting means, for determining relative values of the probabilities that faces of predetermined inclinations will appear in each frame of video images or each image of the plurality of continuous images based on the obtained information, and setting the order of inclinations of faces to be detected according to an order corresponding to the relative values of the probabilities, wherein, in the case that the obtained information indicates that the input images are those obtained by continuous imaging, the face inclination order setting means determines the relative value of the probability that an inclination of a face same as an inclination of a face detected in an immediately preceding image appears in a continuous image which is a target of face detection to be the highest, sets the inclination determined to have the highest relative value of the probability as the highest ordered inclination in the continuous image which is a target of face detection, and sets priorities for other inclination in the order that they are similar to the highest ordered inclination, and wherein, in the case that the obtained information indicates that the input images are those obtained by video imaging, the face inclination order setting means determines the relative value of the probability that an inclination of a face same as an inclination of a frame which is a target of face detection appears in the frame which is a target of a face detection to be the highest, sets the inclination determined to have the highest relative value of the probability as the highest ordered inclination in the frame which is a target of a face detection, and sets priorities for other inclinations in the order that they are similar to the highest ordered inclination.

4. The face detecting apparatus as recited in claim 3, wherein the face inclination order setting means sets the priorities of other inclinations by rotating a reference inclination in increments of predetermined angles within the planes of the frame or continuous image which is the target of face detection, the reference inclination being the inclination which has been set as the highest ordered inclination.

5. A non-transitory computer readable medium having recorded thereon a program that causes a computer to function as a face detecting apparatus for detecting faces while varying the inclination of faces to be detected in each frame of video images or each image of the plurality of continuous images, which are input images, comprising:

an information obtaining means, for obtaining information regard whether the input images are those obtained by continuous imaging or those obtained by video imaging; and a face inclination order setting means, for determining relative values of the probabilities that faces of predetermined inclinations will appear in each frame or each of the plurality of continuous images based on the obtained information, and setting the order of inclinations of faces to be detected according to an order corresponding to the relative values of the probabilities;

wherein, in the case that the obtained information indicates that the input images are those obtained by continuous imaging, the face inclination order setting means determines the relative value of the probability that an inclination of a face same as an inclination of a face detected in an immediately preceding image appears in a continuous image which is a target of face detection is determined to be the highest, sets the inclination determined to have the highest relative value of the probability as the highest ordered inclination in the continuous image which is a target of face detection, and sets priorities for other inclination in the order that they are similar to the highest ordered inclination, and wherein, in the case that the obtained information indicates that the input images are those obtained by video imaging, the face inclination order setting means determines the relative value of the probability that an inclination of a face same as an inclination of a frame which is a target of face detection appears in the frame which is a target of a face detection to be the highest, sets the inclination determined to have the highest relative value of the probability as the highest ordered inclination in the frame which is a target of a face detection, and sets priorities for other inclinations in the order that they are similar to the highest ordered inclination.

6. The non-transitory computer readable medium according to claim 5, wherein the face inclination order setting means sets the priorities of other inclinations by rotating a reference inclination in increments of predetermined angles within the planes of the frame or continuous image which is the target of face detection, the reference inclination being the inclination which has been set as the highest ordered inclination.

* * * * *